US006701141B2

(12) United States Patent
Lam

(10) Patent No.: US 6,701,141 B2
(45) Date of Patent: Mar. 2, 2004

(54) MIXED SIGNAL TRUE TIME DELAY DIGITAL BEAMFORMER

(75) Inventor: Larry K. Lam, San Jose, CA (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/313,758

(22) Filed: May 18, 1999

(65) Prior Publication Data

US 2002/0013133 A1 Jan. 31, 2002

(51) Int. Cl.[7] .................................................. H04B 7/00

(52) U.S. Cl. .................... 455/273; 455/137; 455/562.1; 342/368

(58) Field of Search ................................ 342/375, 368, 342/377, 360, 562, 561, 272, 273, 276, 278.1, 137; 710/5; 84/622; 380/203

(56) References Cited

U.S. PATENT DOCUMENTS

| | | | | |
|---|---|---|---|---|
| 4,688,045 A | | 8/1987 | Knudsen | |
| 4,749,995 A | | 6/1988 | Hopwood et al. | |
| 4,924,234 A | * | 5/1990 | Thompson | 342/375 |
| 5,079,557 A | | 1/1992 | Hopwood et al. | |
| 5,130,717 A | | 7/1992 | Ewen et al. | |
| 5,289,142 A | | 2/1994 | Upton | |
| 5,308,918 A | * | 5/1994 | Yamauchi et al. | 84/622 |
| 5,414,433 A | | 5/1995 | Chang | |
| 5,563,610 A | * | 10/1996 | Reudink | 342/375 |
| 5,659,572 A | * | 8/1997 | Schilling | 342/375 |
| 5,745,076 A | | 4/1998 | Turlington et al. | |
| 5,856,804 A | * | 1/1999 | Turcotte et al. | 342/375 |
| 6,345,099 B1 | * | 2/2002 | Alvarez | 380/203 |
| 6,353,863 B1 | * | 3/2002 | Nakagawa et al. | 710/5 |

* cited by examiner

*Primary Examiner*—Nay Maung
*Assistant Examiner*—Philip J. Sobutka
(74) *Attorney, Agent, or Firm*—Townsend and Townsend and Crew LLP

(57) ABSTRACT

An apparatus for implementing true time delay digital beamformers for forming transmit and/or receive beams in array antennas. The apparatus includes a mixed signal application-specific integrated circuit (ASIC), which is comprised of an analog-to-digital converter (A/D) as an input circuit, an internal digital delay circuit, and a digital-to-analog converter (D/A) as an output circuit. The internal digital delay circuit provides true time delays that are selectable based on digital control, whereas the A/D and D/A circuits provide the interface circuits for the analog input and output signals. Formation of receive beams are accomplished by a plurality of mixed signal ASICs, low pass filters and analog combiners, where these components are connected in a configuration to combine a plurality of low pass filtered and time delayed analog signals located at the outputs of a plurality of mixed signal ASICs. Formation of transmit beams are accomplished by a plurality of analog splitters, mixed signal ASICs and low pass filters, where these components are connected in a configuration to distribute low pass filtered and time delayed analog signals to a plurality of subarrays in an array antenna. The design of the digital delay unit, which is internal to the mixed signal ASIC, is intended to provide true time delays, with a delay increment equal to a fraction of the period of the digital clock that drives the digital delay unit.

19 Claims, 11 Drawing Sheets

MIXED SIGNAL TRUE TIME DELAY DIGITAL BEAMFORMER

BACKGROUND OF THE INVENTION

1. Field of the Invention

The present invention relates generally to implementing array antenna and radar systems, and more particularly to implementing true time delay digital beamformers.

2. Related Art

Phased array antennas, such as are commonly used in radar, consist of multiple stationary antenna elements, which are fed coherently and use variable phase or time-delay control at each element to scan a beam to given angles in space. The primary reason for using phased arrays is to produce a directive beam that can be repositioned (scanned) electronically. True time delays are required when the difference in arrival times of signals across the array is greater than the reciprocal of the signal bandwidth. Since the difference in arrival times is a function of the angle of arrival, the need for true time delays is based on the maximum scan angle. A reference in this field is authored by Robert J. Maillous, entitled "Phased Array Antenna Handbook", published by Artech House, 1994.

One conventional method for achieving the time delays required is by using transmission line based delay media. According to one approach, each signal is switched to one of a plurality of radio frequency (RF) cables or optical fiber cables, each having a different length. By routing a signal through a cable of a particular length, a known delay can be imposed upon the signal.

One disadvantage of this approach is that the lengths of the cables must be controlled precisely to achieve the precise delays required by beamforming. In addition, the cables corresponding to specified delays must be RF phase matched relative to reference cables. This matching process is costly and time-consuming.

Another disadvantage to this approach is that the switches and cables are lossy. As the RF signals pass through various circuits, switches, cables, and the like, amplifiers are required to keep the signals above the noise level. These amplifiers add cost, size and weight and require additional power.

Another conventional method for implementing the true time delays is to use a digital signal processor (DSP). According to this method, analog-to-digital converters (A/D) are used to convert the signals to be delayed into digital form. The resulting digital signals are then processed by the DSP to achieve the desired signal delays.

The DSP approach has three significant disadvantages when the clocking frequencies are greater than, say, one GHz. First, GHz digital signals contain high frequency harmonics, thus controlled impedance transmission lines or 50 ohm lines are required to implement the interconnections between DSP modules. For example, a 2 GHz clock signal contains a harmonic at 6 GHz with a significant amplitude of about 30% of the amplitude of the fundamental harmonic. Since the wavelength at 6 GHz is about 1.1 inch for a low dielectric permittivity material (that is, a low-K material), to preserve the shape and integrity of GHz digital signals, reflections of harmonics must be minimized. Interconnecting GHz digital signals between DSP modules is a time consuming and costly task that requires the application of microwave engineering, involving design, simulation, testing, and verification.

Second, the DSP would have numerous inputs and outputs. This results in numerous interconnections, each of which requires power to drive. This is especially the case when the speed of the digital data is on the order of 1 GHz or more, because each interconnect is terminated into, say, a 50 ohm load that requires power to drive.

Third, the distribution of high frequency data and clock signals requires higher quality and more expensive transmission lines. An analog signal conveying the same amount of information as the digital signals requires less bandwidth. Thus analog signals could be distributed on lower quality and less expensive transmission lines.

Finally, the distribution and summation of digital signal require more power because the voltage levels required by digital logic circuits are relatively high. On the other hand, the distribution and summation of analog signal require less power, because these functions can be accomplished at relatively low voltage levels.

SUMMARY OF THE INVENTION

The present invention is an apparatus for the implementation of a true time delay digital beamformer. An architecture is disclosed for the hardware implementation of true time delay digital beamformers, for forming transmit as well as receive beams in array antennas. The present invention provides the logic circuit design for the hardware implementation of mixed signal application-specific integrated circuits (ASIC). Also disclosed is the logic circuit design for the hardware implementation of the circuit, comprising a collection of hard-wired finite impulse response (FIR) filters that provide programmable fractional delays.

The present invention is an apparatus for use in a mixed signal true time delay digital beamformer. The apparatus includes a mixed signal application-specific integrated circuit (ASIC) having an analog-to-digital converter (A/D), a digital delay unit coupled to the A/D output, and a digital-to-analog converter (D/A) coupled to the digital delay unit output.

According to one embodiment, the apparatus includes a further mixed signal ASIC and an analog combiner coupled to the D/A output of each mixed signal ASIC.

In one aspect, the apparatus includes a low pass filter coupled to the output of the analog combiner; a gain control element coupled to the output of the low pass filter; and a further A/D coupled to the output of the gain control element.

In one aspect, the apparatus includes first and second subarrays that receives an electromagnetic signal; first and second downconverters respectively coupled to the first and second subarrays; and first and second low pass filters respectively coupled to the first and second downconverters; wherein the first and second low pass filters are respectively coupled to the mixed signal ASIC and the further mixed signal ASIC.

According to another embodiment, the apparatus includes a further mixed signal ASIC; and a splitter coupled to the input of each mixed signal ASIC.

In one aspect, the apparatus includes a gain control element coupled to the to the input of the splitter; a low pass filter coupled to the to the input of the gain control element; and a further D/A coupled to the input of the low pass filter.

In one aspect, the apparatus includes first and second low pass filters respectively coupled to the mixed signal ASIC and the further mixed signal ASIC; first and second upconverters respectively coupled to the first and second low pass filters; an upconverter coupled to the output of the D/A; and first and second subarrays respectively coupled to the first and second upconverters.

In one aspect, the digital delay unit includes a shift register as an input circuit; a multiplexer coupled to the shift register outputs; and a digital filter coupled to the multiplexer outputs.

In one aspect, the digital filter includes a plurality of finite impulse response (FIR) filters, wherein each FIR filter is activated and selected as the output of the digital filter according to a filter select signal.

In one aspect, the apparatus each FIR filter is hard-wired to implement a unique predetermined time delay.

One advantage of the present invention is that it represents a significant reduction in size, weight, power, and interconnect complexity when compared to a digital beamformer based on a conventional design.

Another advantage of the present invention is that it minimizes interconnections, by a factor of four or more.

Further features and advantages of the present invention as well as the architecture and the operation of various embodiments of the present invention are described in detail below with reference to the accompanying drawings.

BRIEF DESCRIPTION OF THE FIGURES

The present invention will be described with reference to the accompanying drawings

DETAILED DESCRIPTION OF THE PREFERRED EMBODIMENTS

The present invention is described in terms of the above example. This is for convenience only and is not intended to limit the application of the present invention. In fact, after reading the following description, it will be apparent to one skilled in the relevant art how to implement the present invention in alternative embodiments.

Four embodiments of the present invention will be discussed. Each employs a digital true time delay element. In a preferred embodiment, the true time delay element is implemented as an application-specific integrated circuit (ASIC) that includes both analog and digital technologies. Hereinafter, this element is referred to as a mixed signal ASIC (MSA). Beamforming transmitters and receivers employing the MSA are described in which the MSA operates at both baseband and intermediate frequency (IF).

Figure 1:
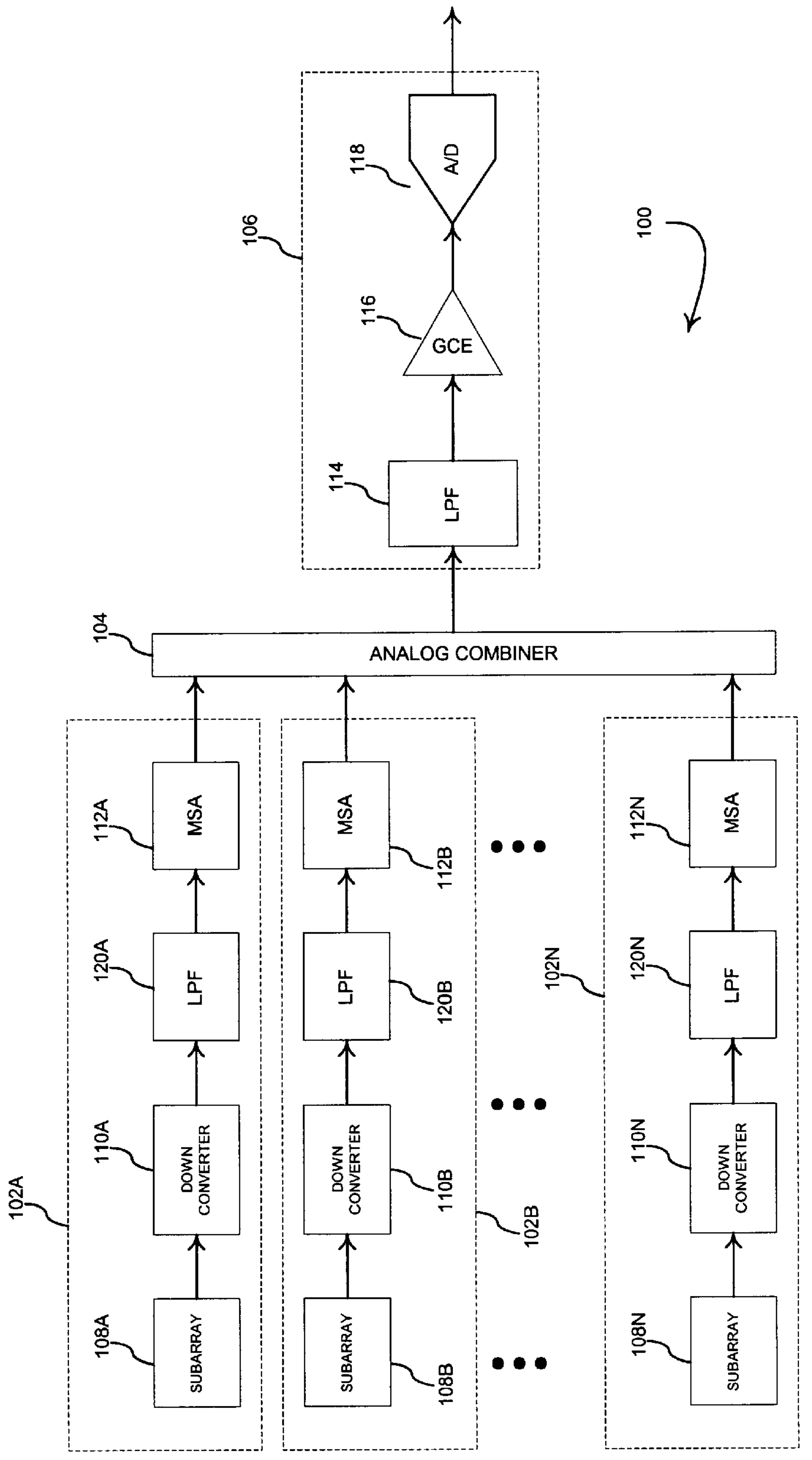
FIG. 1 depicts a receive array with an IF beamformer according to a preferred embodiment of the present invention.

FIG. 1 depicts a receive array with an IF beamformer 100 according to a preferred embodiment of the present invention. Receiver 100 includes a plurality of subarray assemblies 102A, 102B, through 102N, an analog combiner 104, and an output circuit 106. Analog combiner 104 combines the outputs of subarray assemblies 102 and provides the combined signal to output circuit 106.

Each subarray assembly includes a subarray 108, a downconverter 110, a low-pass filter (LPF) 120 and a MSA 112. Each subarray includes a plurality of antenna elements, each coupled to a phase shifter or the like, as is well-known in the relevant arts.

Beamforming is accomplished in two stages. First, each subarray 108 performs beamforming for the signals received by its antenna elements by adjusting the phase of each of the received signals using phase shifters or the like, and then combining the phase-shifted signals, according to well-known methods.

The second stage of beamforming involves combining the composite signals produced by the subarrays using true time delays, as will now be described. The signal from each subarray 108 is downconverted to IF by downconverter 110. Downconverters such as downconverter 110 are well-known in the relevant arts. LPF 120 suppresses aliasing. Each MSA 112 applies a predetermined true time delay to the IF signal. MSAs 112 can implement different time delays, under the control of a controller (not shown), in order to form antenna beams in different directions. MSA 112 is described in greater detail below. Analog combiner 104 receives the time-shifted subarray signals and combines them. An exemplary analog combiner is described below with reference to FIG. 8.

Output circuit 106 includes a low-pass filter (LPF) 114, a gain control element (GCE) 116, and an analog-to-digital converter 118 (A/D). The output of analog combiner 104 is applied to LPF 114, which eliminates harmonics. In a preferred embodiment, each MSA 112 includes a digital-to-analog (D/A) converter at its output to produce an analog output signal. As is well-known, the output signal of a D/A contains high-frequency components produced by the clock of the digital signal. LPF 114 removes the high-frequency components. Then GCE 116, which can be implemented using an adjustable gain amplifier, is used to maximize dynamic range. Finally, A/D 118 converts the signal from an analog form to a digital form for processing by digital signal processors and the like.

Figure 2:
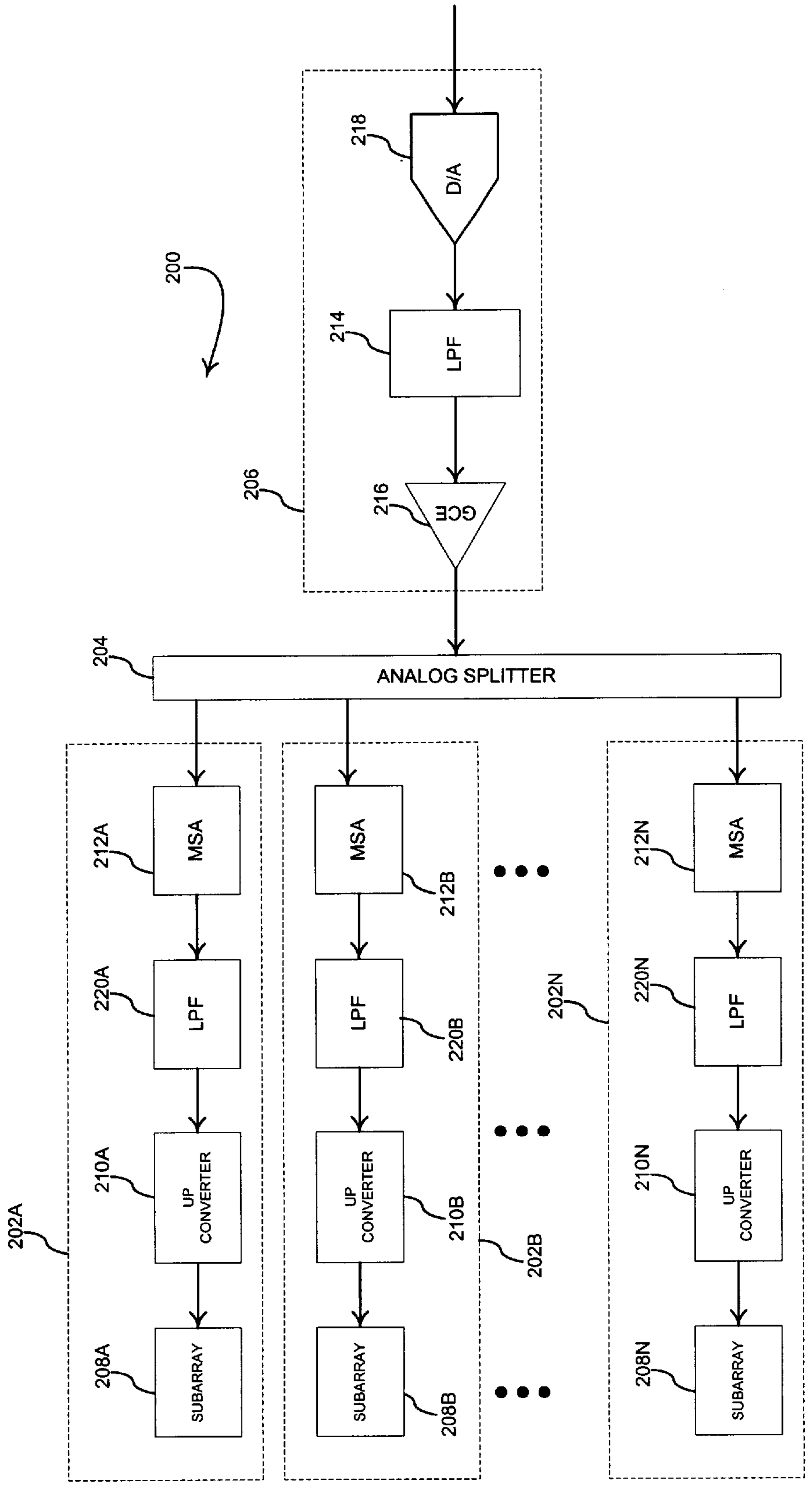
FIG. 2 depicts a transmit array with an IF beamformer according to a preferred embodiment of the present invention.

FIG. 2 depicts a transmit array with an IF beamformer 200 according to a preferred embodiment of the present invention. Transmit array 200 includes a plurality of subarray assemblies 202A, 202B, through 202N, an analog splitter 204, and an input circuit 206.

Input circuit 206 includes a gain control element (GCE) 216, a low-pass filter (LPF) 214, and a digital-to-analog converter 218 (D/A). D/A 218 receives a digital input signal from a digital signal processor oil the like and converts the signal to analog form. The signal is then filtered by LPF 214. GCE 216 amplifies the analog signal.

Analog splitter 204 receives the analog signal and splits it for distribution to subarray assemblies 202. An exemplary analog splitter is described below with respect to FIG. 8. Each subarray assembly 202 includes a subarray 208, an upconverter 210, an LPF 220 and an MSA 212. Each subarray 208 includes a plurality of antenna elements, each coupled to a phase shifter or the like, as is well-known in the relevant arts.

Beamforming in the transmit array 200 is accomplished in two stages. First, each of the transmit signals from analog splitter 204 is delayed by a predetermined interval by an MSA 212. LPF 220 suppresses aliasing. Each delayed signal is then upconverted from IF to microwave frequency by upconverter 210 according to well-known methods.

Each subarray 208 splits the signal from the corresponding upconverter 210 into a number of signals corresponding to the number of radiating elements in the subarray. Each signal is then processed to produce a predetermined phase shift in a manner similar to that described for subarrays 102. The phase-shifted signals are then radiated by the antenna elements to form a beam.

Figure 3:
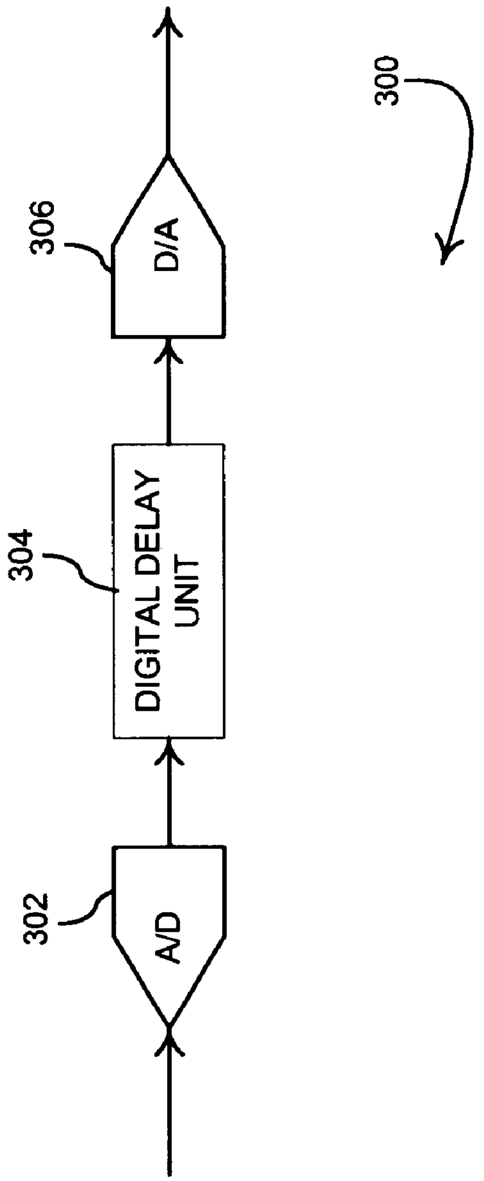
FIG. 3 depicts a mixed signal application-specific integrated circuit (MSA) according to a preferred embodiment.

FIG. 3 depicts an MSA 300 that is used to implement MSA 112 or MSA 212 in a preferred embodiment. MSA 300 includes an A/D 302, a digital delay unit 304, and a D/A 306. A/D 302 receives an analog signal and converts it to digital form. Digital delay unit 304 imposes a selected delay upon the digital signal as specified by one or more control signals (not shown). The delayed signal is then converted back into an analog signal by D/A 306. The details of digital delay unit 304 are discussed below.

Figure 4:
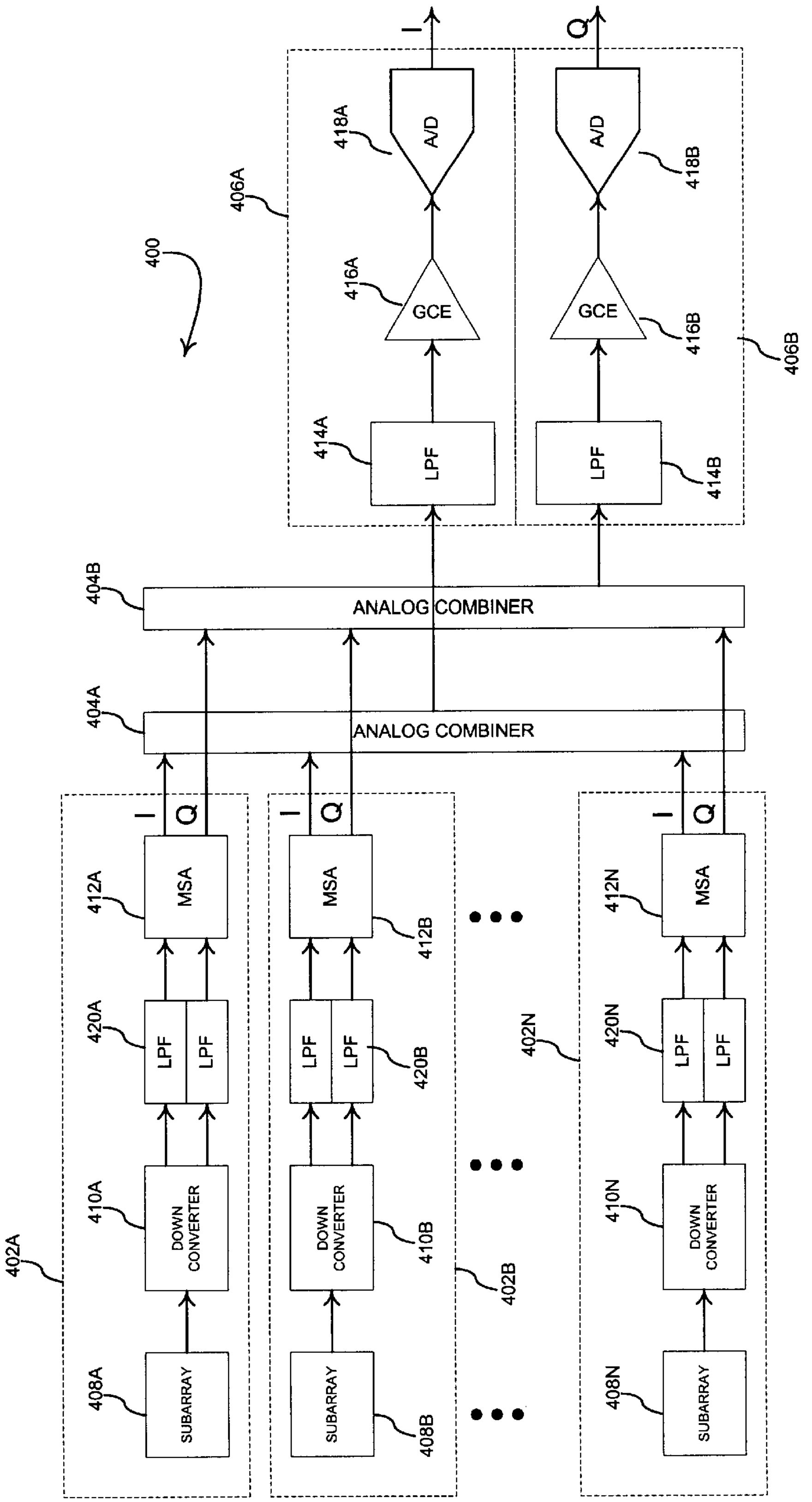
FIG. 4 depicts a receive array with a baseband beamformer according to a preferred embodiment of the present invention.

FIG. 4 depicts a receive array with a baseband beamformer 400 according to a preferred embodiment of the present invention. Receive array 400 includes a plurality of subarray assemblies 402A, 402B, through 402N, analog combiners 404A,B, and output circuits 406A,B. In a preferred embodiment, the baseband beamformer in the receive array 400 operates in a quadrature mode. Thus, each subarray assembly produces two signals. One of the signals is referred to as in-phase signal (I) and the other is referred to as a quadrature signal (Q).

Analog combiner 404A combines the in-phase outputs of subarray assemblies 402 and provides the combined signal to output circuit 406A. Analog combiner 404B combines the quadrature outputs of subarray assemblies 402 and provides the combined signal to output circuit 406B.

Each subarray assembly includes a subarray 408, a downconverter 410, a pair of LPFs 420 and a MSA 412. Beamforming is accomplished in a manner similar to that described for the receive array with an IF beamformer 100. Each subarray 408 performs beamforming to produce a subarray signal. This signal is downconverted from microwave to baseband by downconverter 410. Downconverter 410 also provides quadrature demodulation to produce in-phase and quadrature signals. Downconverters such as downconverter 410 are well-known in the relevant arts.

LPFs 420 suppress aliasing. Each MSA 412 applies a predetermined true time delay to the baseband signals. MSAs 412 can implement different time delays, under the control of a controller (not shown), in order to form antenna beams in multiple directions. MSA 412 is described in greater detail below.

Each output circuit 406 includes a low-pass filter (LPF) 414, a gain control element (GCE) 416, and an analog-to-digital converter 418 (A/D). Each output circuit 406 operates in a manner similar to that described for output circuit 106 to produce signals suitable for digital signal processing.

Output circuit 406A processes the signal produced by analog combiner 404A to produce an in-phase digital signal. Output circuit 406B processes the signal produced by analog combiner 404B to produce a quadrature digital signal.

Figure 5:
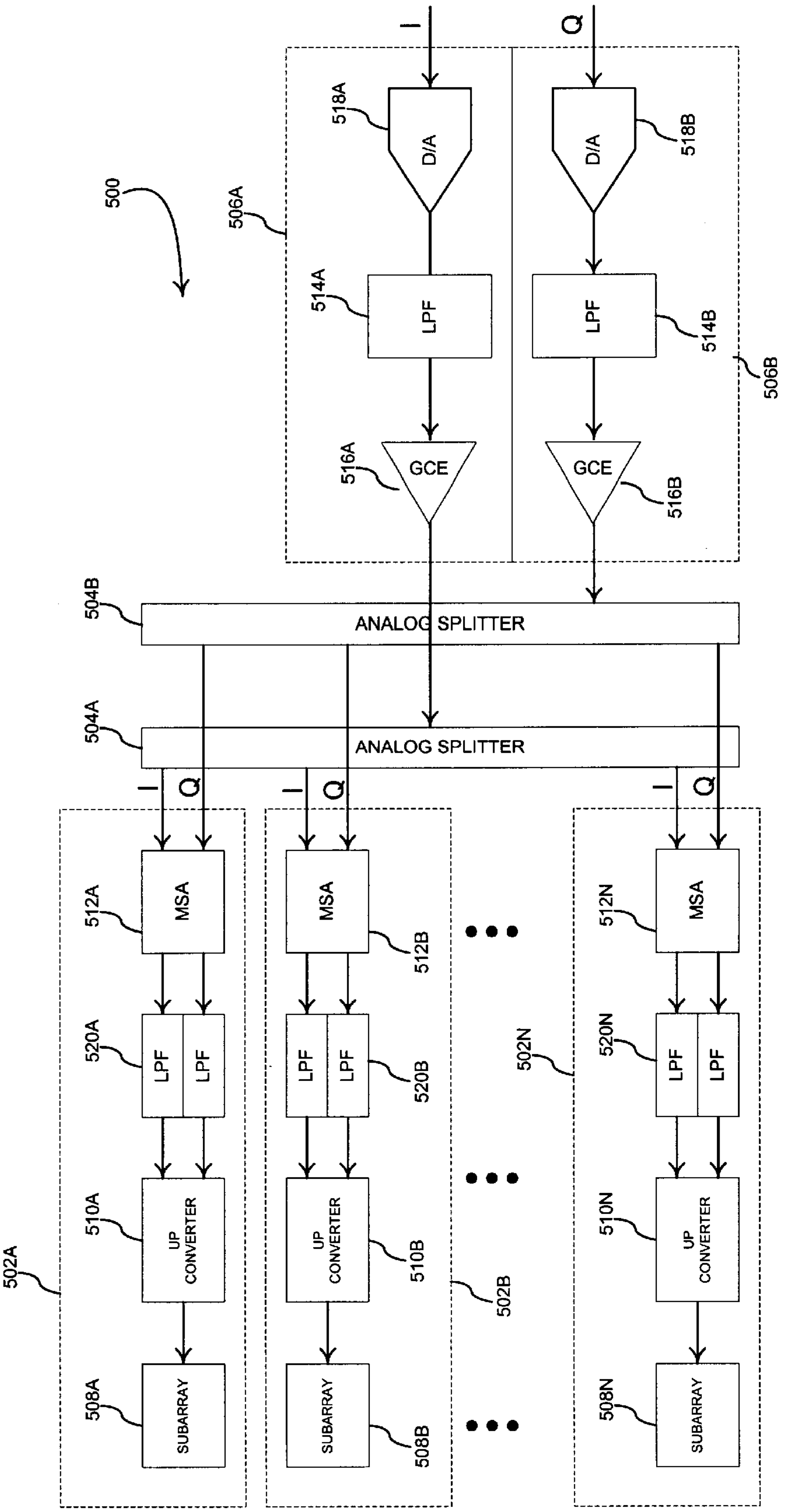
FIG. 5 depicts a transmit array with a baseband beamformer according to a preferred embodiment of the present invention.

FIG. 5 depicts a transmit array with a baseband beamformer 500 according to a preferred embodiment of the present invention. Transmitter 500 includes a plurality of subarray assemblies 502A, 502B, through 502N, analog splitters 504A,B, and input circuits 506A,B.

Input circuit 506A receives an in-phase digital signal from a digital signal processor or the like, and provides an analog signal to analog splitter 504A. Input circuit 506B receives a quadrature digital signal from a digital signal processor or the like, and provides an analog signal to analog splitter 504B. Each input circuit 506 includes a gain control element (GCE) 516, a low pass filter (LPF) 514, and a digital to analog converter (D/A) 518. D/A 518 receives a digital input signal from a digital signal processor or the like and converts the signal to analog form. The analog signal is then filtered by LPF 514 to suppress aliasing. GCE 516 amplifies the filtered analog signal to a suitable level for the next stage distribution.

Each analog splitter 504 receives the analog signal and splits it for distribution to subarray assemblies 502. An exemplary analog splitter is described below with respect to FIG. 8. Each subarray assembly includes a subarray 508, an upconverter 510, a pair of LPFs 520, and an MSA 512. Subarrays 508 operate in a manner similar to that described for subarrays 208.

Beamforming in transmit array 500 is accomplished in two stages. First, each of the transmit signals from analog splitter 504 is delayed by a predetermined interval by an MSA 512. LPFs 510 suppress aliasing. Each delayed signal is then upconverted from baseband to microwave frequency by upconverter 510. Each upconverter 510 operates in quadrature mode to generate a single transmit signal from a pair of input signals according to well-known methods.

Each subarray 508 splits the signal from the corresponding upconverter 510 into a number of signals corresponding to the number of radiating elements in the subarray. Each signal is then processed to produce a predetermined phase shift in a manner similar to that described for subarrays 208. The phase-shifted signals are then radiated by the antenna elements to form a beam.

Figure 6:
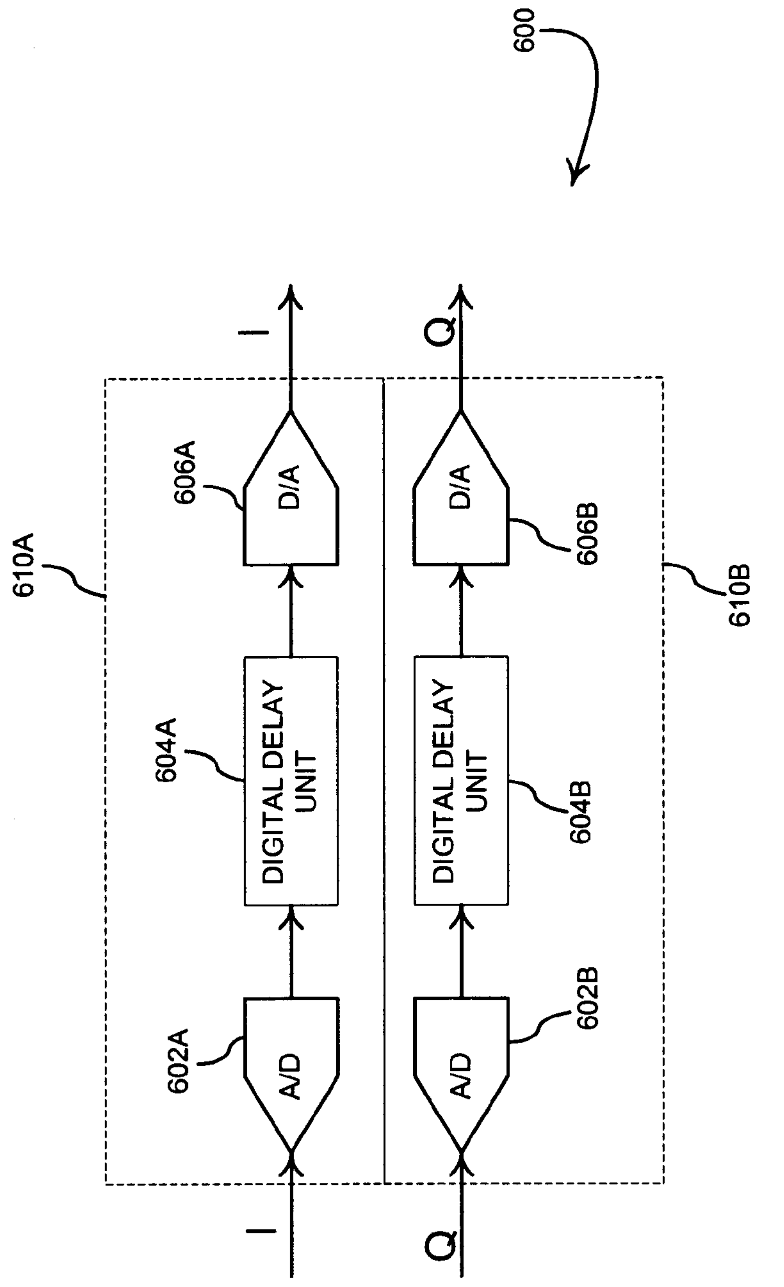
FIG. 6 depicts an MSA according to a preferred embodiment.

FIG. 6 depicts an MSA 600 that is used to implement MSA 412 or MSA 512 in a preferred embodiment. MSA 600 includes a pair of delay elements 610A,B. In other embodiments, a single MSA includes three or more delay elements.

Digital delay element 610A processes the in-phase signal. Digital delay element 610B processes the quadrature signal. Each delay element 610 includes an A/D 602, a digital delay unit 604, and a D/A 606. A/D 602 receives an analog signal and converts it to digital form. Digital delay unit 604 imposes a delay upon the digital input signal. The amount of the delay is specified by a control signal (not shown). The delayed signal is then converted back into an analog signal by D/A 606. The details of digital delay unit 604 are discussed below.

As discussed above, in a preferred embodiment of the MSA, the A/D, digital delay unit, and D/A are fabricate as a single integrated circuit (IC). One advantage of this arrangement is less power is required. The interconnections between sub-micron transistors within a single IC do not require much power to drive. Furthermore, since the distances between circuits on the IC are short compared to the wavelengths of the harmonics of the digital signals, 50 ohm transmission lines are not required for interconnect within the IC.

Another advantage of this arrangement is that the interconnections external to the IC can be simplified.

A simple analog combiner can be used to combine the signals from multiple true time delay elements in a receive beamformer of a phased array antenna system. Similarly, a simple analog splitter can be used to distribute the signals to multiple true time delay elements in a transmit beamformer of a phased array antenna system. In an implementation involving digital input and output signals, more complex circuits would be required for signal combination and distribution.

Figure 7:
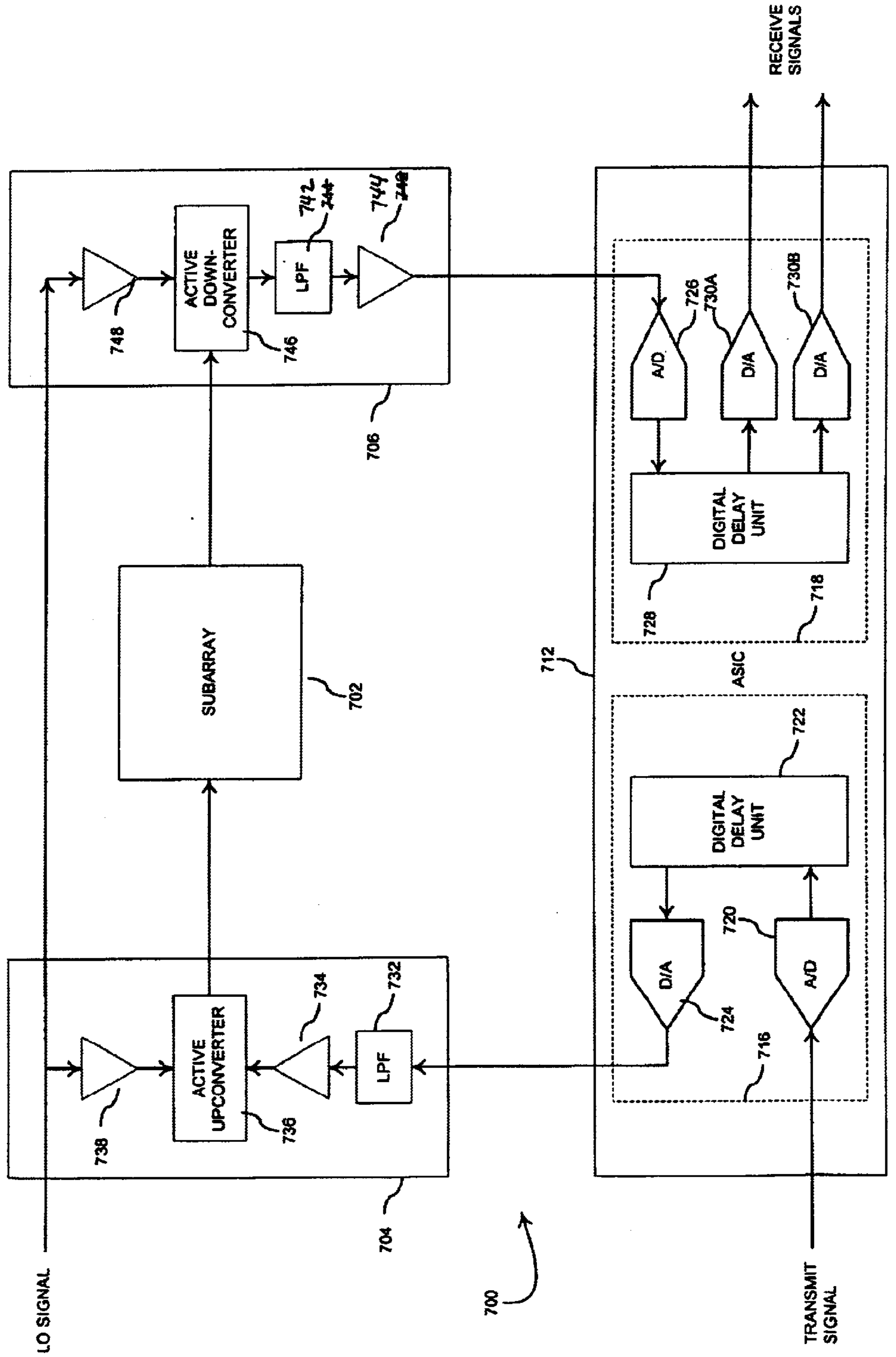
FIG. 7 depicts an implementation of a subarray assembly.

FIG. 7 depicts an implementation of a subarray assembly 700. In a preferred embodiment, subarray assembly 700 is used in the embodiments described above.

Referring to FIG. 7, subarray assembly 700 includes an MSA 712, a transmit monolithic microwave integrated circuit (MMIC) 704, a receive MMIC 706, and a subarray 702. MMICs 704, 706 belong to a category of IC that is commercially available.

MSA 712 includes two digital delay elements. Digital delay element 716 is for transmit and digital delay element 718 is for receive. In a preferred embodiment, both of digital delay elements 716 and 718 are fabricated upon the same 0.18 micrometer complementary metal oxide semiconductor (CMOS) ASIC. In other embodiments, digital delay elements 716 and 718 can be fabricated as separate ASICs.

Digital delay element 716 includes a 3-bit A/D 720, a digital delay unit 722, and a 4-bit D/A 724 in a preferred embodiment. Of course, other bit widths can be used for A/D 720 and D/A 724. A/D 720 receives a transmit signal and converts it to a 3-bit digital signal. Digital delay element 722 imposes a specified delay upon the digital signal, in accordance with commands from a controller (not shown) to produce a 4-bit digital signal. The delayed signal is then converted to analog form by D/A 724. In a preferred embodiment, the entire MSA 712 is clocked at a frequency of 2 GHz.

Transmit MMIC 704 includes an LPF 732, an amplifier 734, an upconverter 736, and an amplifier 738. In a preferred embodiment, upconverter 736 includes active devices such as transistors. Transmit MMIC 704 receives the delayed analog transmit signal and employs LPF 732 to remove the high-frequency components induced by the clock of D/A 724. Upconverter 736 receives the delayed analog transmit signal and a signal from a local oscillator (not shown). Upconverter 736 uses the local oscillator signal to upconvert the delayed analog transmit signal to RF, and provides the upconverted signal to subarray 702 for transmission. In a preferred embodiment, the frequency of the transmitted RF signal is approximately 10 GHz.

Receive MMIC 706 includes an LPF 742, an amplifier 744, a downconverter 746, and an amplifier 748. In a preferred embodiment, downconverter 746 includes active devices such as transistors. Receive MMIC 706 receives an RF signal from subarray 702 and downconverts it to baseband or IF, depending on the beamformer implementation selected. In a preferred embodiment, the frequency of the received RF signal is approximately 10 GHz.

Digital delay element 718 includes a 3-bit A/D 726, a digital delay unit 728, and a pair of 4-bit D/As 730A,B in a preferred embodiment. It should be pointed out that other bit widths can be used for A/D 726 and D/As 730A,B. Digital delay element 718 receives the downconverted signal from MMIC 706. A/D 726 digitizes the signal to produce a 3-bit digital signal. In a preferred embodiment, digital delay unit 728 imposes two predetermined delays upon the signal in accordance with commands or control signals to produce two 4-bit delayed digital receive signals.

One of the delayed digital receive signals is fed to D/A 730A, and the other is fed to D/A 730B. Each D/A 730 converts the received signal into analog form, to produce two signals, which can be used to form a pair of beams.

Each of digital delay units 722 and 728 provides one of a plurality of predetermined delays according to a command or control signal. In a preferred embodiment, these delays range from 0 to 32 nanoseconds in steps of 25 picoseconds.

Figure 8:
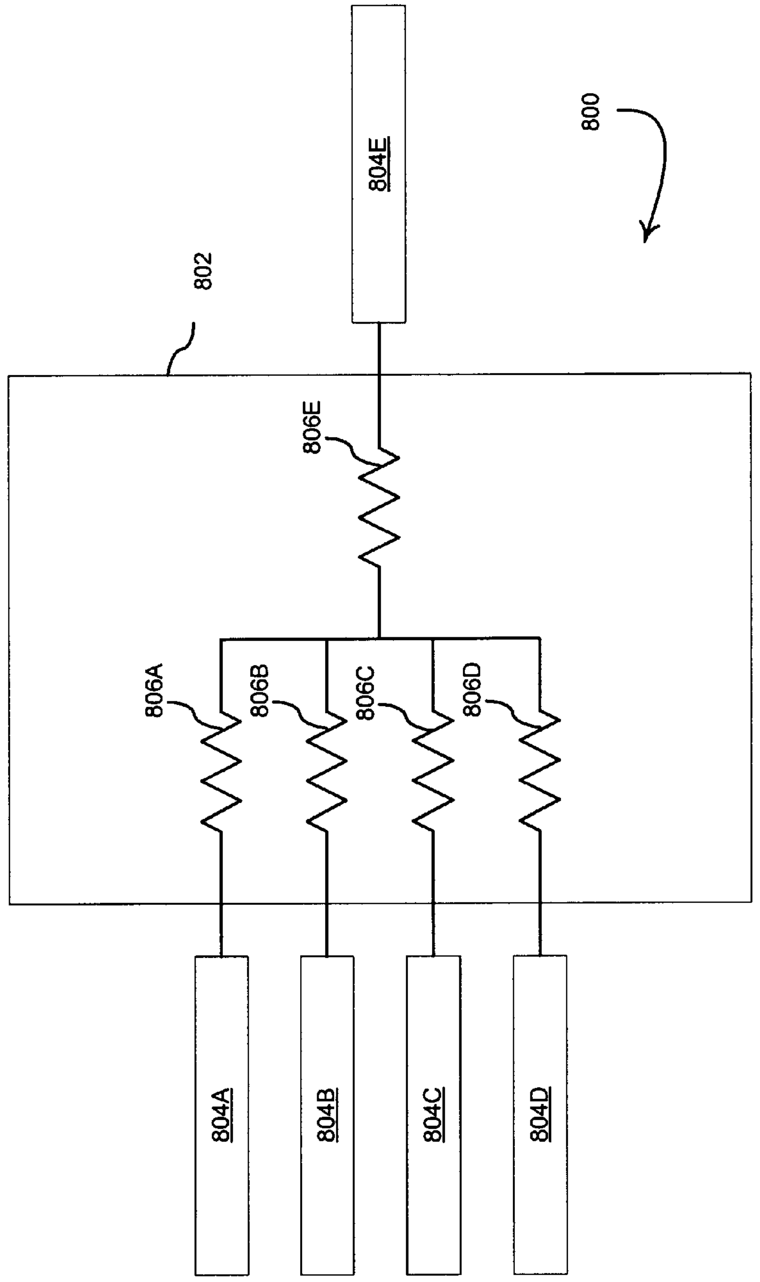
FIG. 8 depicts an 4:1 analog splitter/combiner that can be used to implement analog combiners and analog splitters.

FIG. 8 depicts an 4:1 analog splitter/combiner 800 that can be used to implement analog combiners 104 and 404 and analog splitters 204 and 504. Analog splitter/combiner 800 is a relatively simple circuit, comprising a resistive tree 802 connected to a plurality of 50-ohm transmission lines 804. Of course, this architecture can be used to implement an analog splitter/combiner having any number of branches, as would be apparent to one skilled in the art.

Resistive tree 802 includes a plurality of resistors 806A, B,C,D,E connected to each other in a star topology. In a preferred embodiment, each resistor 806 is a printed resistor having a resistance of 30 ohms.

Each resistor 806 is also connected to one of transmission lines 804A,B,C,D,E. One transmission line acts either as a combiner output in a receiver embodiment, or as splitter input in a transmitter embodiment. One advantage of splitter/combiner 800 is its simple implementation. A further advantage of splitter/combiner 800 is that it is small and lightweight.

Figure 9:
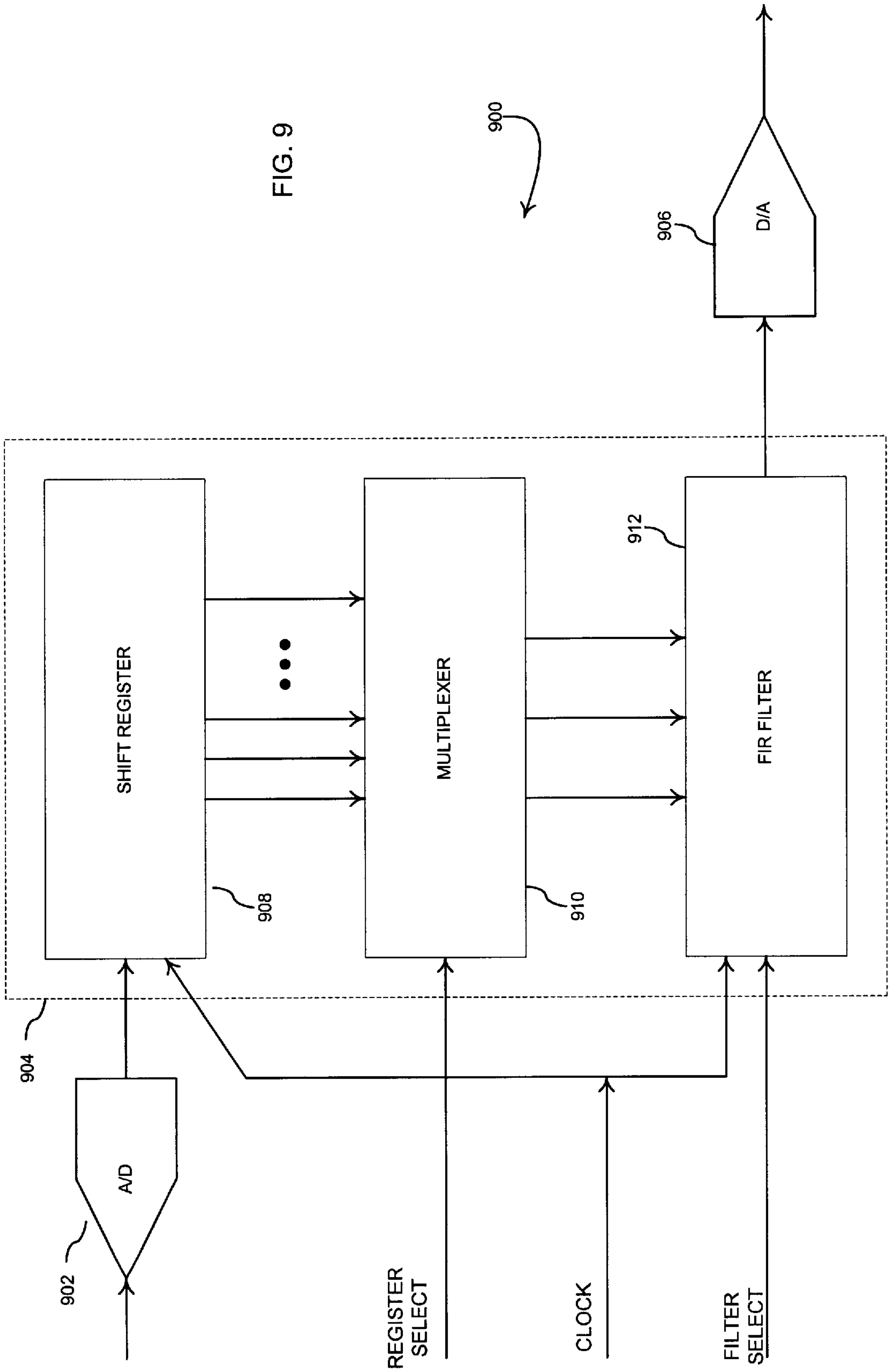
FIG. 9 depicts a digital delay element according to one embodiment of the present invention.

FIG. 9 depicts a digital delay element 900 according to one embodiment of the present invention. Digital delay element 900 can be used to implement digital delay element 610 or MSA 300.

Digital delay element includes a 3-bit A/D 902, a digital delay unit 904, and a 4-bit D/A 906. Digital delay unit 904 includes shift register 908, multiplexer 910, and digital finite impulse response (FIR) filter 912. Shift register 908 is 3 bits wide and 80 bits deep. A/D 902 receives an analog baseband input signal and converts it to a 3-bit digital signal. The signal is fed to shift register 908. According to a preferred embodiment, A/D 902 and shift register 908 are clocked by the same 2.5 GHz clock signal.

Multiplexer 910 selects the contents of a register within shift register 908 according to a register select signal and passes the contents of the selected register to FIR filter 912.

Digital FIR filter 912 is a 3-tap, 5-bit coefficient filter that is clocked by the same 2.5 GHz clock as A/D 902 and shift register 908. Therefore, each register provides a delay of 400 picoseconds.

Digital FIR filter operates according to a filter select signal to achieve a delay precision of less than 400 picoseconds to yield a 4-bit delayed signal. The output of filter 912 is 4 bits wide. This output is provided to a 4-bit D/A 906, which produces a delayed baseband analog signal.

Figure 10:
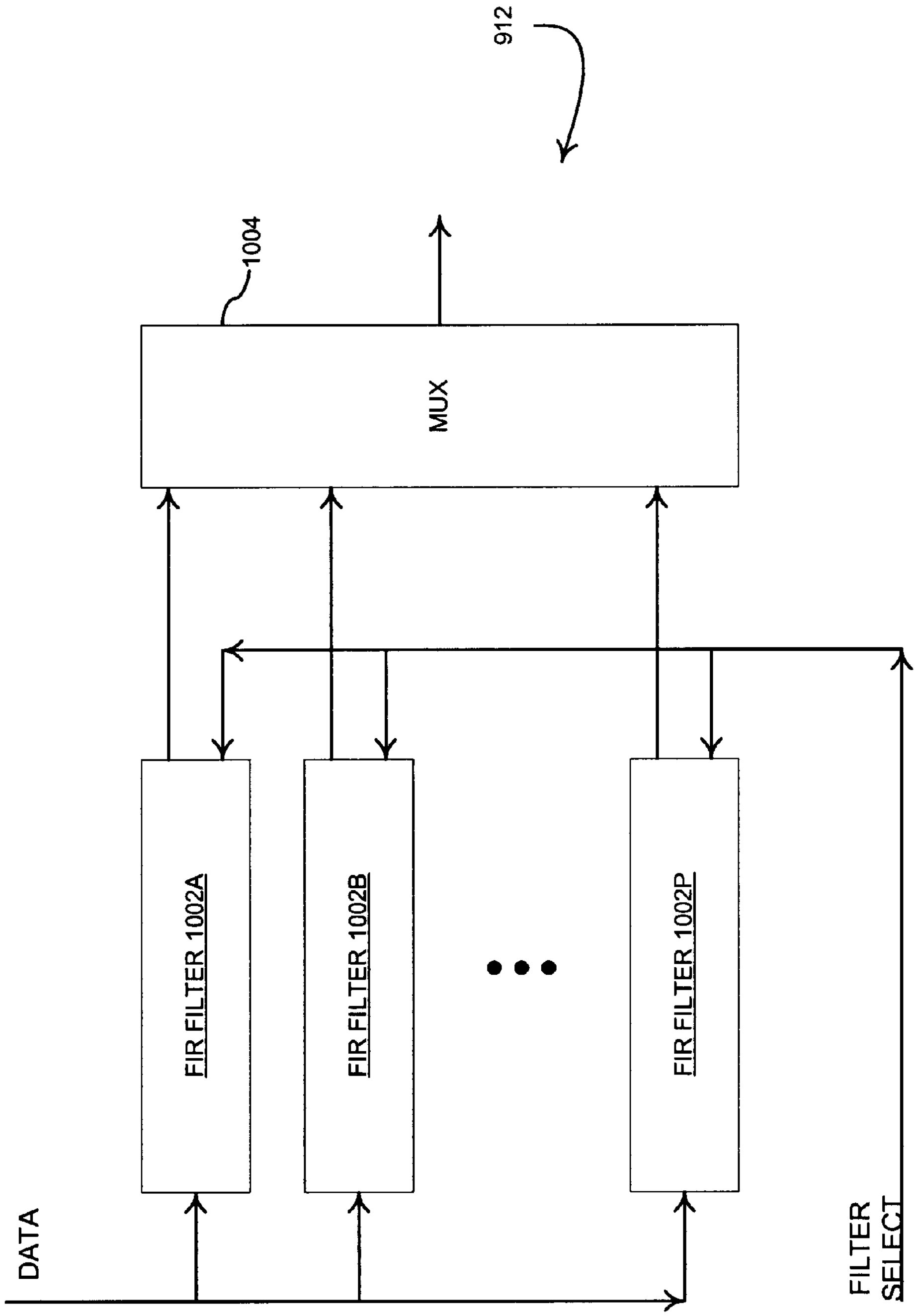
FIG. 10 depicts an implementation of digital FIR filter according to a preferred embodiment of the present invention.

In a preferred embodiment, digital FIR filter 912 is a hard-wired fractional time delay FIR filter. The key advantage of this implementation is reduced power consumption. FIG. 10 depicts such an implementation of digital FIR filter 912 according to a preferred embodiment of the present invention.

Conventional FIR filters employ a plurality of multipliers and accumulators with programmable coefficients to achieve the desired results. In contrast, filter 912 of the present invention employs a collection of pre-defined digital filters 1002 coupled to a multiplexer 1004. In a preferred embodiment, filter 912 includes 16 filters 1002A–P. Each filter 1002 is hard-wired to achieve a particular fractional delay (that is, a fraction of 400 picoseconds). The filter select signal is used to enable a particular filter, and to cause multiplexer 1004 to select that filter for output.

Significant power consumption reduction is achieved because only the selected filter 1002 is powered. The non-selected filters are not powered or enabled. As is well known, CMOS circuits consume much less power when not making voltage transitions.

Figure 11:
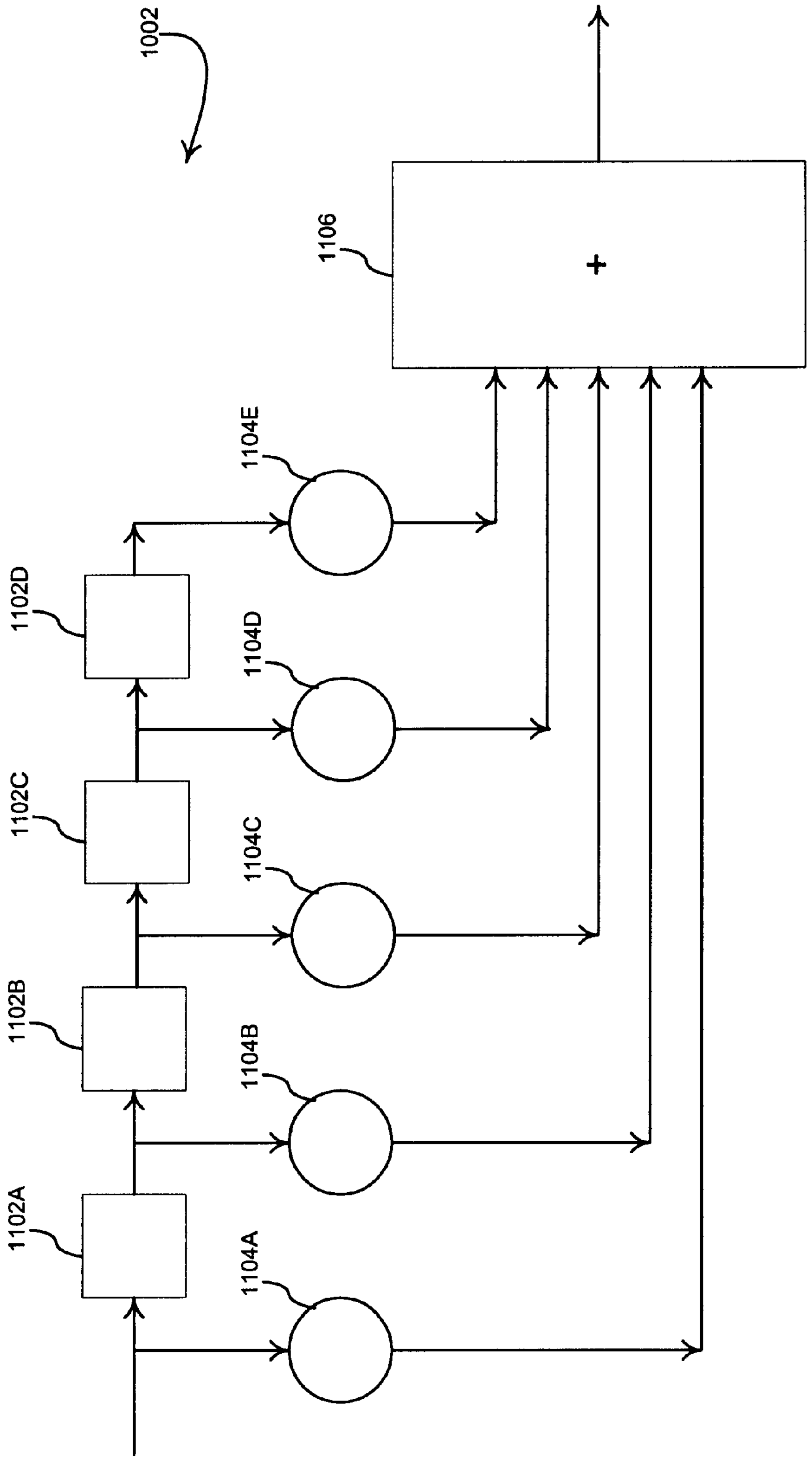
FIG. 11 depicts a logical implementation of a FIR hardwired filter according to a preferred embodiment of the present invention.

FIG. 11 depicts a logical implementation of a FIR hard-wired filter 1002 according to a preferred embodiment of the present invention. The logical implementation includes unit delays 1102A,B,C,D, coefficient multipliers 1104A,B,C,D, E, and an adder 1106. The duration of the unit delay is 1 clock cycle, which is 400 picoseconds. Table 1 presents the values of the coefficients used to implement fractional delays ranging between 200 picoseconds and minus 200 picoseconds. Table 1 also includes the filter gain achieved for each delay. It should be pointed out that the gain of all of the filters is 11. For the two filters where the filter gains are indicated to be 22, the outputs of these filters are divided by 2 to obtain an effective filter gain of 11. The logical filter depicted in FIG. 10 can be implemented by many methods that are well-known in the relevant art.

TABLE 1

| Delay (psec) | $a_1$ | $a_2$ | $a_3$ | $a_4$ | $a_5$ | Filter gain |
|---|---|---|---|---|---|---|
| 200 | 0 | 0 | 11 | 11 | 0 | 22 |
| 175 | 0 | 4 | 11 | −4 | 0 | 11 |
| 150 | 0 | 3 | 14 | −6 | 0 | 11 |
| 125 | 0 | 2 | 15 | −6 | 0 | 11 |
| 100 | 0 | 1 | 14 | −4 | 0 | 11 |
| 75 | 0 | 1 | 12 | −2 | 0 | 11 |
| 50 | 0 | 1 | 12 | −2 | 0 | 11 |
| 25 | 0 | 0 | 13 | −1 | −1 | 11 |
| 0 | 0 | −1 | 13 | −1 | 0 | 11 |
| −25 | −1 | −1 | 13 | 0 | 0 | 11 |
| −50 | 0 | −2 | 12 | 1 | 0 | 11 |
| −75 | 0 | −2 | 12 | 1 | 0 | 11 |
| −100 | 0 | −4 | 14 | 1 | 0 | 11 |
| −125 | 0 | −6 | 15 | 2 | 0 | 11 |
| −150 | 0 | −6 | 14 | 3 | 0 | 11 |
| −175 | 0 | −4 | 11 | 4 | 0 | 11 |
| −200 | 0 | 11 | 11 | 0 | 0 | 22 |

Conclusion

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus comprising:

a mixed signal integrated circuit having:

an analog-to-digital converter (A/D);

a digital true-time delay unit coupled to the A/D output, the digital true-time delay unit including a shift register and a multiplexer coupled to the shift register outputs; and a digital-to-analog converter (D/A) coupled to the digital true-time delay unit output;

a further mixed signal ASIC;

an analog combiner coupled to the D/A output of each mixed signal ASIC;

a low pass filter coupled to the output of the analog combiner;

a gain control element coupled to the output of the low pass filter;

a further A/D coupled to the output of the gain control element;

first and second subarrays, each of the first subarray and the second subarray receiving an electromagnetic signal;

first and second downconverters respectively coupled to the first and second subarrays; and first and second low pass filters respectively coupled to the first and second downconverters;

wherein the first and second low pass filters are respectively coupled to the mixed signal ASIC and the further mixed signal ASIC.

2. The apparatus of claim 1, and further comprising:

an another analog combiner coupled to the mixed signal ASIC and the further mixed signal ASIC, an input signal of the analog combiner being an in-phase signal, an input signal of the another analog combiner being a quadrature signal;

an another low pass filter coupled to an output of the another analog combiner;

an additional first low pass filter and an additional second low pass filter respectively coupled to the first downconverter and the second downconverter;

wherein the additional first low pass filter and the additional second low pass filter are respectively coupled to the mixed signal ASIC and the further mixed signal ASIC.

3. An apparatus comprising:

a mixed signal application-specific integrated circuit having:

an analog-to-digital converter (A/D);

a digital true-time delay unit coupled to the A/D output, the digital true-time delay unit including a shift register and a multiplexer coupled to the shift register outputs; and a digital-to-analog converter (D/A) coupled to the digital true-time delay unit output;

a further mixed signal ASIC;

a splitter coupled to the input of each mixed signal ASIC;

a gain control element coupled to the input of the splitter;

a low pass filter coupled to the input of the gain control element;

a further D/A coupled to the input of the low pass filter;

first and second low pass filters respectively coupled to the mixed signal ASIC and the further mixed signal ASIC;

first and second upconverters respectively coupled to the first and second low pass filters; and first and second subarrays respectively coupled to the first and second upconverters.

4. The apparatus of claim 3, and further comprising:

an additional splitter coupled to an additional input of the mixed signal ASIC and an additional input of the further mixed signal ASIC, an output signal of the splitter is an in-phase signal, an output signal of the additional splitter is an quadrature signal;

an additional gain control element coupled to an input of the additional splitter;

an additional first low pass filter and an additional second low pass filter respectively coupled to the mixed signal ASIC and the further mixed signal ASIC;

wherein the first upconverter and the second upconverter respectively coupled to the additional first low pass filter and the additional second low pass filter.

5. An apparatus comprising:

a mixed signal application-specific integrated circuit having:

an analog-to-digital converter (A/D);

a digital true-time delay unit coupled to the A/D output, the digital true-time delay unit including a shift register and a multiplexer coupled to the shift register outputs; and a digital-to-analog converter (D/A) coupled to the digital true-time delay unit output;

wherein the digital true-time delay unit further comprises a digital filter coupled to the multiplexer outputs; and the digital filter comprises a plurality of finite impulse response (FIR) filters; and each FIR filter is activated and selected as the output of the digital filter according to a filter select signal.

6. The apparatus of claim 5, wherein each FIR filter is hard-wired to implement a unique predetermined time delay.

7. The apparatus of claim 5 wherein each of the plurality of FIR filters includes at least one unit delay, at least one coefficient multiplier, and at least one adder.

8. The apparatus of claim 1, 3, or 5, wherein the shift register is operable to provide a dynamically configurable path length.

9. The apparatus of claim 8, wherein the multiplexer is operable to dynamically select an output of the shift register to configure the dynamically configurable path length to define the digital true-time delay applied by the digital true-time delay unit.

10. The apparatus of claims 1, 3, or 5, wherein the analog-to-digital converter (A/D), the digital true-time delay unit, and the digital-to-analog converter (D/A) are located in close physical proximity.

11. A method of providing a mixed signal application-specific integrated circuit comprising:

providing an analog-to-digital converter (A/D);

providing a digital true-time delay unit coupled to the A/D output, the digital true-time delay unit including a shift register and a multiplexer coupled to the shift register outputs;

providing a digital-to-analog converter (D/A) coupled to the digital true-time delay unit output;

providing a further mixed signal ASIC;

providing an analog combiner coupled to the D/A output of each mixed signal ASIC;

providing a low pass filter coupled to the output of the analog combiner;

providing a gain control element coupled to the output of the low pass filter;

providing a further A/D coupled to the output of the gain control element;

providing first and second subarrays, each of the first subarray and the second subarray receiving an electromagnetic signal;

providing first and second downconverters respectively coupled to the first and second subarrays; and providing first and second low pass filters respectively coupled to the first and second downconverters;

wherein the first and second low pass filters are respectively coupled to the mixed signal ASIC and the further mixed signal ASIC.

12. A method of providing a mixed signal application-specific integrated circuit comprising:

providing an analog-to-digital converter (A/D);

providing a digital true-time delay unit coupled to the A/D output, the digital true-time delay unit including a shift register and a multiplexer coupled to the shift register outputs;

providing a digital-to-analog converter (D/A) coupled to the digital true-time delay unit output;

providing a further mixed signal ASIC;

providing a splitter coupled to the input of each mixed signal ASIC;

providing a gain control element coupled to the input of the splitter;

providing a low pass filter coupled to the input of the gain control element;

providing a further D/A coupled to the input of the low pass filter;

providing first and second low pass filters respectively coupled to the mixed signal ASIC and the further mixed signal ASIC;

providing first and second upconverters respectively coupled to the first and second low pass filters; and providing first and second subarrays respectively coupled to the first and second upconverters.

13. A method of providing a mixed signal application-specific integrated circuit comprising:

providing an analog-to-digital converter (A/D);

providing a digital true-time delay unit coupled to the A/D output, the digital true-time delay unit including a shift register and a multiplexer coupled to the shift register outputs;

providing a digital-to-analog converter (D/A) coupled to the digital true-time delay unit output;

wherein the digital true-time delay unit further comprises a digital filter coupled to the multiplexer outputs;

the digital filter comprises a plurality of finite impulse response (FIR) filters; and each FIR filter is activated and selected as the output of the digital filter according to a filter select signal.

14. The method of claim 13, wherein each FIR filter is hard-wired to implement a unique predetermined time delay.

15. The method of claims 11, 12, or 13, wherein the shift register is operable to provide a dynamically configurable path length.

16. The method of claim 15, wherein the multiplexer is operable to dynamically select an output of the shift register to configure the dynamically configurable path length to define the digital true-time delay applied by the digital true-time delay unit.

17. A method for receiving a beam, the method comprising:

receiving a first array of signals;

generating a first composite signal based on at least information associated with the first array of signals;

receiving a second array of signals;

generating a second composite signal based on at least information associated with the second array of signals;

converting the first composite signal to a first analog signal;

converting the second composite signal to a second analog signal;

removing at least one high-frequency component of the first analog signal;

removing at least one high-frequency component of the second analog signal;

converting the first analog signal to a first digital signal;

converting the second analog signal to a second digital signal;

delaying the first digital signal by a first shift register and a first multiplexer coupled to the first shift register;

delaying the second digital signal by a second shift register and a second multiplexer coupled to the second shift register;

converting the first digital signal to a third analog signal;

converting a second digital signal to a fourth analog signal;

combining the third analog signal and the fourth analog signal into a combined signal;

removing at least one high-frequency component of the combined signal to generate a filtered signal;

applying a gain control to the filtered signal; and converting the filtered signal to an output digital signal.

18. A method for transmitting a beam, the method comprising:

converting an input digital signal to a first analog signal;

removing at least one high-frequency component of the first analog signal;

applying a gain control to the first analog signal;

splitting the first analog signal into a second analog signal and a third analog signal;

converting the second analog signal to a first digital signal;

converting the third analog signal to a second digital signal;

delaying the first digital signal by a first shift register and a first multiplexer coupled to the first shift register;

delaying the second digital signal by a second shift register and a second multiplexer coupled to the second shift register;

converting the first digital signal to a fourth analog signal;

converting the second digital signal to a fifth analog signal;

removing at least one high-frequency component of the fourth analog signal;

removing at least one high-frequency component of the fifth analog signal;

converting the fourth analog signal to a sixth analog signal;

converting the fifth analog signal to a seventh analog signal;

generating a first array of signals based on at least information associated with the sixth analog signal;

transmitting the first array of signals;

generating the second array of signals based on at least information associated with the seventh analog signal;

transmitting the second array of signals.

19. A method for providing a time delay to a signal, the method comprising:

converting a first analog signal to a first digital signal;

providing a time delay to the first digital signal by a shift register, a multiplexer coupled to the shift register, and a digital filter coupled to the multiplexer;

converting the first digital signal to a second analog signal;

wherein the digital filter includes a plurality of finite impulse response filters and each of the plurality of finite impulse response filters is activated and selected as an output of the digital filter based on at least information associated with a filter select signal.

* * * * *

UNITED STATES PATENT AND TRADEMARK OFFICE
CERTIFICATE OF CORRECTION

PATENT NO. : 6,701,141 B2
DATED : March 2, 2004
INVENTOR(S) : Lawrence K. Lam

It is certified that error appears in the above-identified patent and that said Letters Patent is hereby corrected as shown below:

Title page,
Item [56], References Cited, U.S. PATENT DOCUMENTS,
add -- 6,178,207 * 1/2001 Richards et al. 375/259 --.

Drawings,
Figure 7, delete "

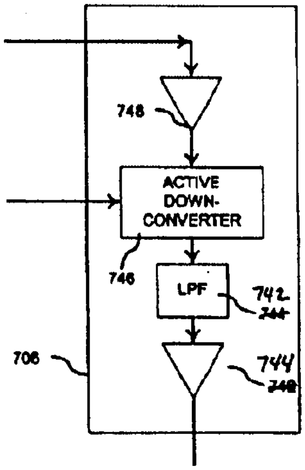

" and insert --

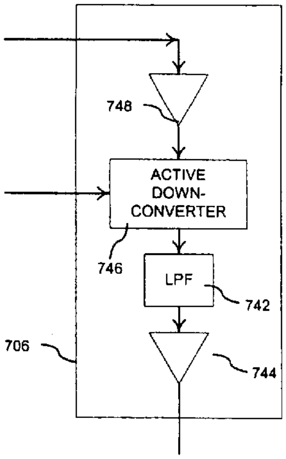

--.

Column 4,
Line 65, "processor oil the like" should read -- processor or the like --.

Signed and Sealed this

Sixteenth Day of May, 2006

JON W. DUDAS
*Director of the United States Patent and Trademark Office*